(12) United States Patent
Diamond et al.

(10) Patent No.: US 9,050,662 B2
(45) Date of Patent: Jun. 9, 2015

(54) PORTABLE ADJUSTABLE MULTIPLE END DRILL DEVICE

(71) Applicant: Benjamin Diamond, Bronx, NY (US)

(72) Inventors: Benjamin Diamond, Bronx, NY (US); Ali M. Sadegh, Franklin Lakes, NJ (US)

(73) Assignee: Benjamin Diamond, Bronx, NY (US)

( * ) Notice: Subject to any disclaimer, the term of this patent is extended or adjusted under 35 U.S.C. 154(b) by 254 days.

(21) Appl. No.: 13/787,719

(22) Filed: Mar. 6, 2013

(65) Prior Publication Data

US 2014/0255114 A1    Sep. 11, 2014

(51) Int. Cl.
*B23B 39/16*    (2006.01)
*B23B 39/18*    (2006.01)

(52) U.S. Cl.
CPC .............. *B23B 39/18* (2013.01); *B23B 39/162* (2013.01); *Y10T 408/21* (2015.01); *Y10T 408/655* (2015.01); *Y10T 29/49895* (2015.01); *B23B 2260/004* (2013.01)

(58) Field of Classification Search
CPC ...... B23B 47/30; B23B 39/16; B23B 39/163; B23B 39/162; B23B 39/161
USPC .............. 408/117, 42, 46, 53, 147, 151, 152, 408/153, 157, 158, 181, 182, 183, 125, 408/131; 279/137, 144
See application file for complete search history.

(56) References Cited

U.S. PATENT DOCUMENTS

| | | | | |
|---|---|---|---|---|
| 1,246,250 | A | * | 11/1917 | Eisler ........................ 74/665 R |
| 2,019,669 | A | * | 11/1935 | Furness ........................ 408/117 |
| 2,430,522 | A | * | 11/1947 | Melnicxak ................... 408/117 |
| 5,065,498 | A | | 11/1991 | McKenzie |
| 6,007,277 | A | | 12/1999 | Olson et al. |
| 7,059,812 | B2 | | 6/2006 | McFarlane |
| 7,997,835 | B2 | | 8/2011 | Whitehead et al. |

* cited by examiner

*Primary Examiner* — Eric A Gates
*Assistant Examiner* — Paul M Janeski
(74) *Attorney, Agent, or Firm* — Law Office of Pasquale Musacchio LLC

(57) ABSTRACT

A portable adjustable multiple end drill device comprises a rotary power source communicating with a plurality of end drill units. The device includes restraints for holding the rotary power source and a hearing rigidly attached to the restraints for rotating the device. The device includes two end-caps, each of which is connected to a respective arm directly or via at least one modular extension of a respective arm. The end-caps are also connected to guide bars and a splined power transmission shaft. The device imparts a set of rectilinearly aligned work areas of a work piece, which work areas are respectively and simultaneously drilled by the respective drill bits. A rectilinear position of each end drill unit can be adjusted mechanically. Each drill bit holder, or base, holding a respective drill bit or fastener bit is rotated by a system of bearing-journaled drive gears.

19 Claims, 11 Drawing Sheets

PORTABLE ADJUSTABLE MULTIPLE END DRILL DEVICE

FIELD OF THE INVENTION

The present invention relates to portable adjustable multiple end drill devices for simultaneously drilling a plurality of rectilinearly aligned holes or fastening a plurality of rectilinearly aligned fasteners.

BACKGROUND OF THE INVENTION

It is desirable to expand the drilling capability of a hand-held electric drill. In one known configuration, an electric hand-held drill includes an internal magazine that stores a plurality of drill bits. However, such configurations only allow one drill bit to be used at a time. In another configuration, a turret is used that contains a plurality of chucks. While this configuration is able to hold a plurality of drill bits or fastener bits simultaneously, only one bit can be used at a time to drill a hole or fasten a fastener. In particular, when one drill bit or fastener bit and its chuck are in use, the other drill bits or fastener bits and chucks are stationary. In a further configuration, an operator is able to drill a plurality of rectilinearly aligned holes or fasten a plurality of rectilinearly aligned fasteners simultaneously. However, a disadvantage with this configuration is that distances between all holes must still be manually measured and locations marked using a measuring device and writing utensil. Another disadvantage is that the amount by which the spacing between drill or fastener bits may be adjusted is limited. A further disadvantage is that the operator must hold a multiple-bit drill in place with at least one of his/her hands throughout the entire drilling or driving process, as well as the electric drill supplying power to the multiple-bit drill.

Moreover, larger units for drilling holes or fastening fasteners that are at great distances from one another require a large number of moving parts, several of which may not even be used in such situations. Additionally, parts that are not being used cannot be easily removed. Many gears, pivot arms, and chucks are permanently or semi-permanently attached to the multi-bit drill and are not meant to be easily removed when not in use.

SUMMARY OF THE INVENTION

The present invention is a portable adjustable multiple end drill device for simultaneously and conveniently drilling a plurality of rectilinearly aligned holes, or for fastening a plurality of rectilinearly aligned fasteners. This invention features a plurality of end drill units. The operator can move and secure any end drill unit of this device to any metrically designated location along the guide bars with minimal restrictions. The device is powered by an input drill, which is secured to the device using hand-screws, arms, and end-caps. Rotary power is transmitted directly from the input drill, which is a typical electrically- or pneumatically-powered unit, to the main end drill unit by means of an input shaft. The input shaft is rigidly attached to an input gear located inside the main end drill unit. The input gear is mated to a series of gears, these also being located inside the main end drill unit. These gears transmit rotary power from the input drill to the drill bit or fastener bit connected to the main end drill unit and to a spline shaft that is connected to the gears located inside each auxiliary end drill unit being used. The gears located inside each auxiliary end drill unit transmit rotary power from the spline shaft to the drill bit or fastener hit connected to the auxiliary end drill unit. The spline shaft permits simultaneous rotation of all drill bits and/or fastener bits being used with the device while facilitating convenient adjustment of the positions of the end drill units with respect to their common axis.

BRIEF DESCRIPTION OF THE ACCOMPANYING DRAWINGS

Figure 9:
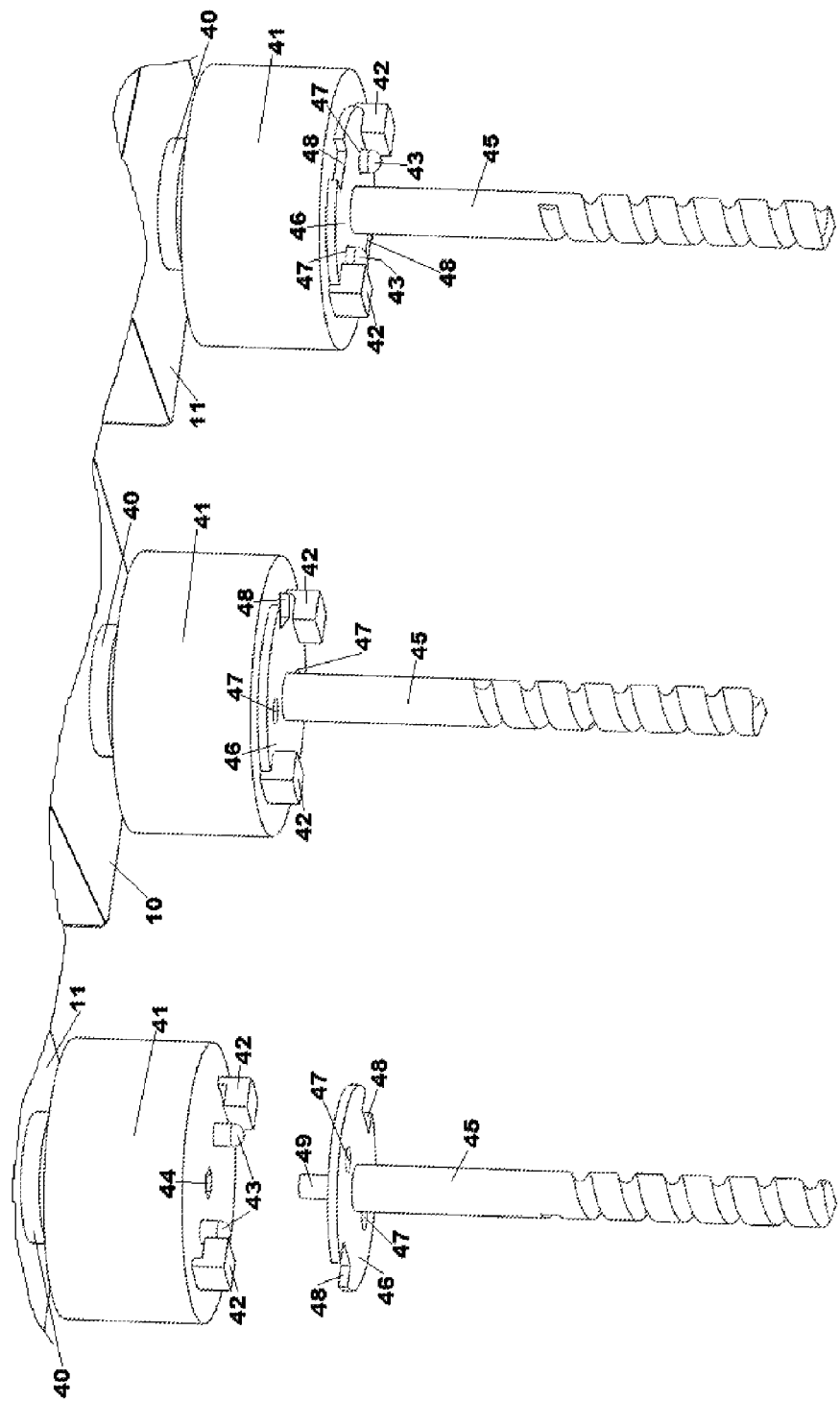

FIG. 9 details drill/fastener bases and compatible drill bits.

Figure 10:
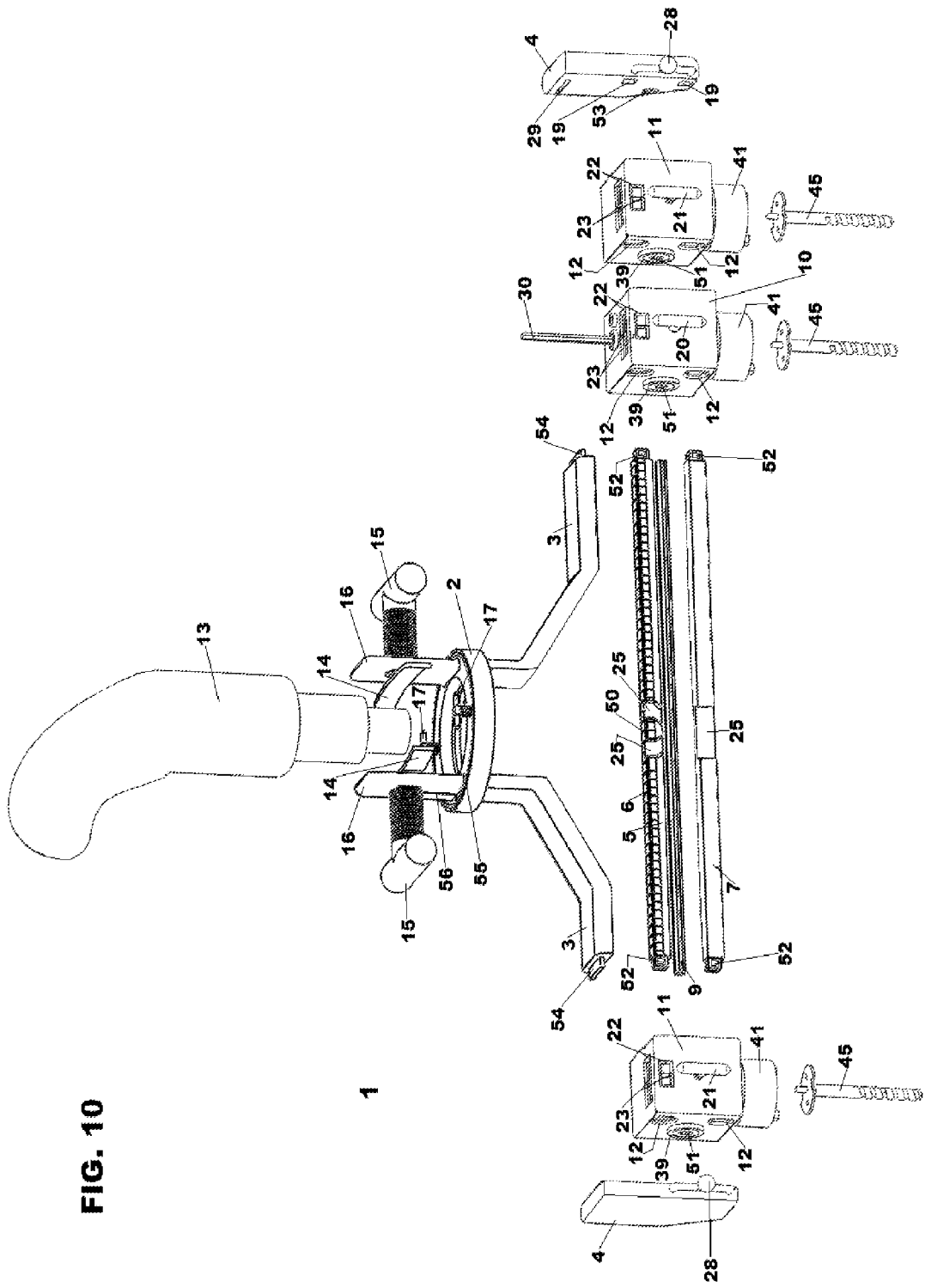

FIG. 10 is an exploded view of the multiple end drill device.

Figure 11:
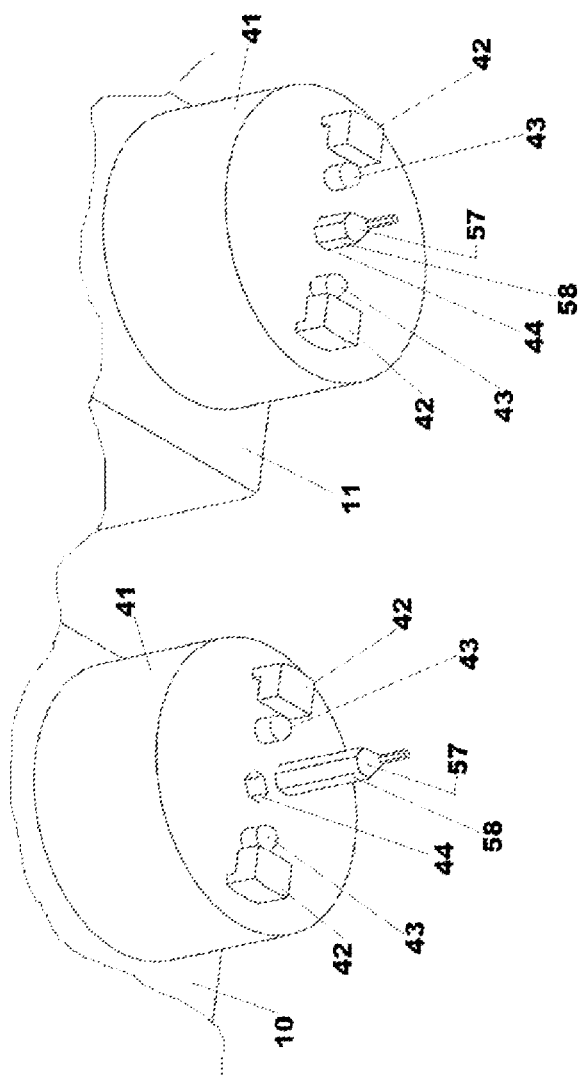

FIG. 11 shoe is conventional fastener bits being secured in drill/fastener bases.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-11.

Referring to FIGS. 1 through 4, a portable adjustable multiple end drill device 1 comprises a large bearing 2, the outer member of which is rigidly attached to tabbed arms 3, which are connected to two end-caps 4; an upper guide bar 5 with a plurality of rectilinear calibrations 6; a lower guide bar 7; a spline shaft 9; a main end drill unit 10; and a plurality of auxiliary end drill units 11. Each end drill unit 10 and 11 comprises a base 41 used to secure a drill bit 45. Rotary power is provided by an input drill 13, which is a typical hand-held unit powered by a line-connected AC motor, a battery-powered DC motor, or a pneumatic motor. The bearing 2 enables rotation of the input drill 13 relative to an axis 59 of an input shaft 30. The input drill 13 is secured by two drill holders 14, each connected to a hand-screw 15 by means of a ball-and-socket joint. The hand-screws 15 are turned through threaded holes in vertical bars 16 rigidly attached to the inner member of the bearing 2. The bearing 2 is restrained by two thumb-screws 17. The input drill 13 provides power to the device 1 through an input shaft 30, which is connected to the spline shaft 9 through a gearing system inside the main end drill unit 10. The spline shaft 9 transmits rotary power from the main end drill unit 10 to each auxiliary end drill unit 11. Each end drill unit 10 and 11 features four through holes 12, two pairs on opposite walls, to accommodate the guide bars 5 and 7.

Figure 6:
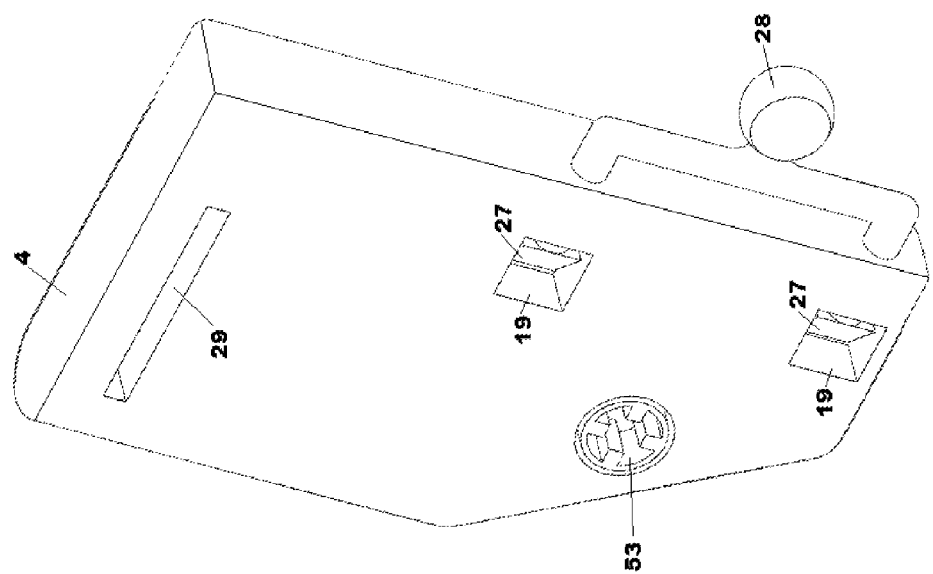
FIG. 6 is a cutaway view of the right-side end-cap.
Figure 7:
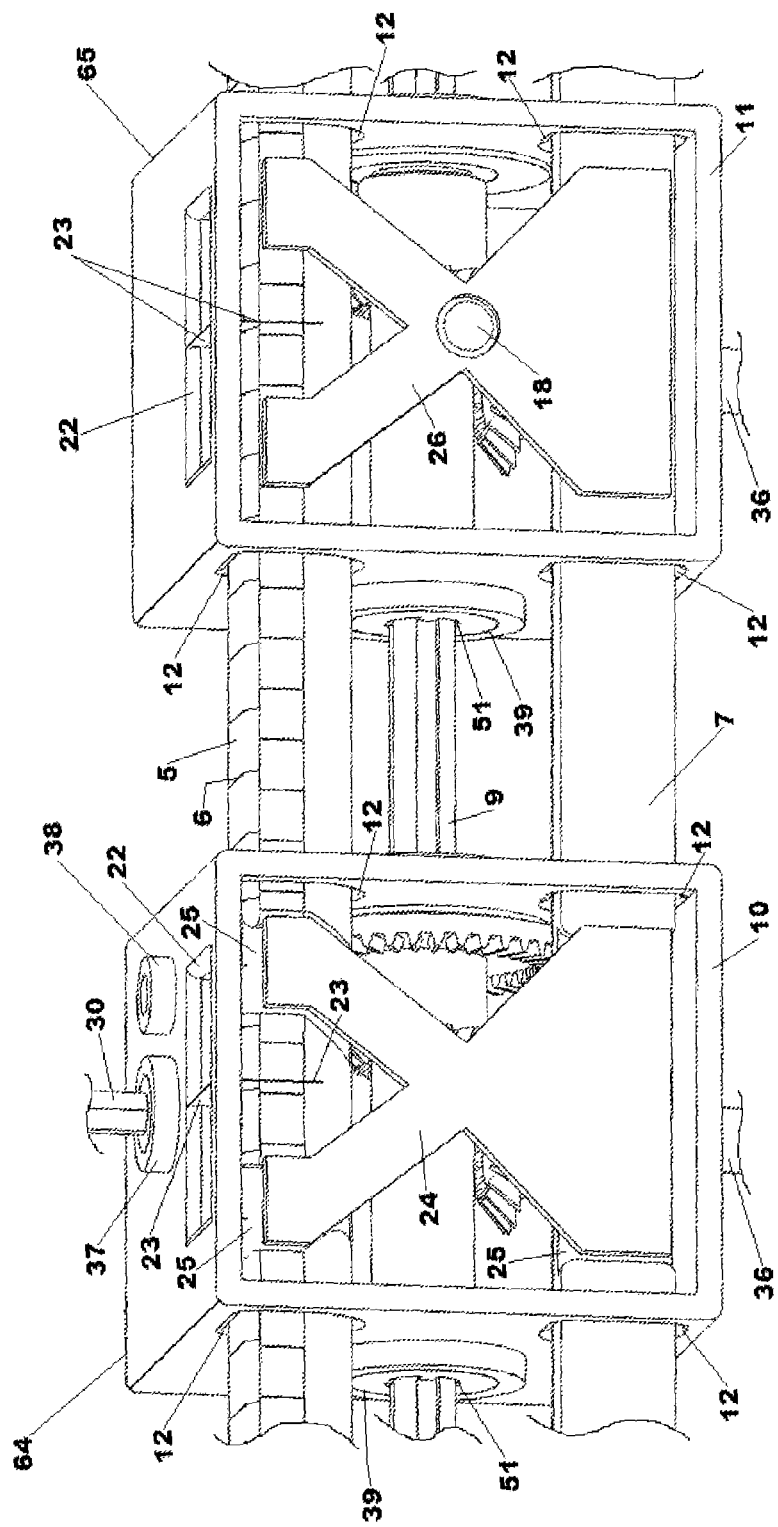
FIG. 7 is a cutaway view of the end drill units of this invention, detailing the components used for the securement mechanisms for each end drill unit.

Referring to FIG. 6, each end-cap 4 contains two recesses 19 exposing two spring-loaded latches 27 rigidly attached to a knob 28; a single latch-less recess 29; and a spline shaft bearing 53. Referring to FIG. 7, the main end drill unit 10 includes a handle 20 (shown in FIG. 1) having a spring loaded protrusion 60 that extends through a front surface 61 of a casing 64 for main end drill unit 11. The main end drill unit 10 is secured to guide bars 5 and 7 by a restraining cruciform slab 24 that is urged against indentations 25 formed in guide bars 5 and 7 by the protrusion 60. In one embodiment, the indentations 25 are located at centers of the guide bars 5 and 7. Further, the guide bars 5 and 7 may include three indentations. Each auxiliary end drill unit 11 includes as thumb-screw 21 (shown in FIG. 1) having a projecting screw portion 62 that is threadably engaged with a front surface 63 of a casing 65 for respective auxiliary end drill unit 11. Each auxiliary end drill unit 11 is secured to the guide bars 5 and 7 by a restraining cruciform slab 26, which is urged against guide bars 5 and 7 via contact between the screw portion 62 and a ball-and-socket joint 18. Each auxiliary end drill unit 11 may be located as desired relative to the main end drill unit 10. For example, a first end drill unit 11 may be spaced closer to the main end drill unit 10 than a second end drill unit 11. Alternatively, the second end drill unit 11 may be spaced closer to the main end drill unit 10 than the first end drill unit 11. In addition, first and second end drill units 11 may be equally spaced relative to the main end drill unit 10. Each end drill unit 10 and 11 features viewing windows 22 (also shown in FIG. 1). Each viewing window 22 features a dial 23 of the same width as each of the calibrations 6 of the upper guide bar 5.

Figure 1:
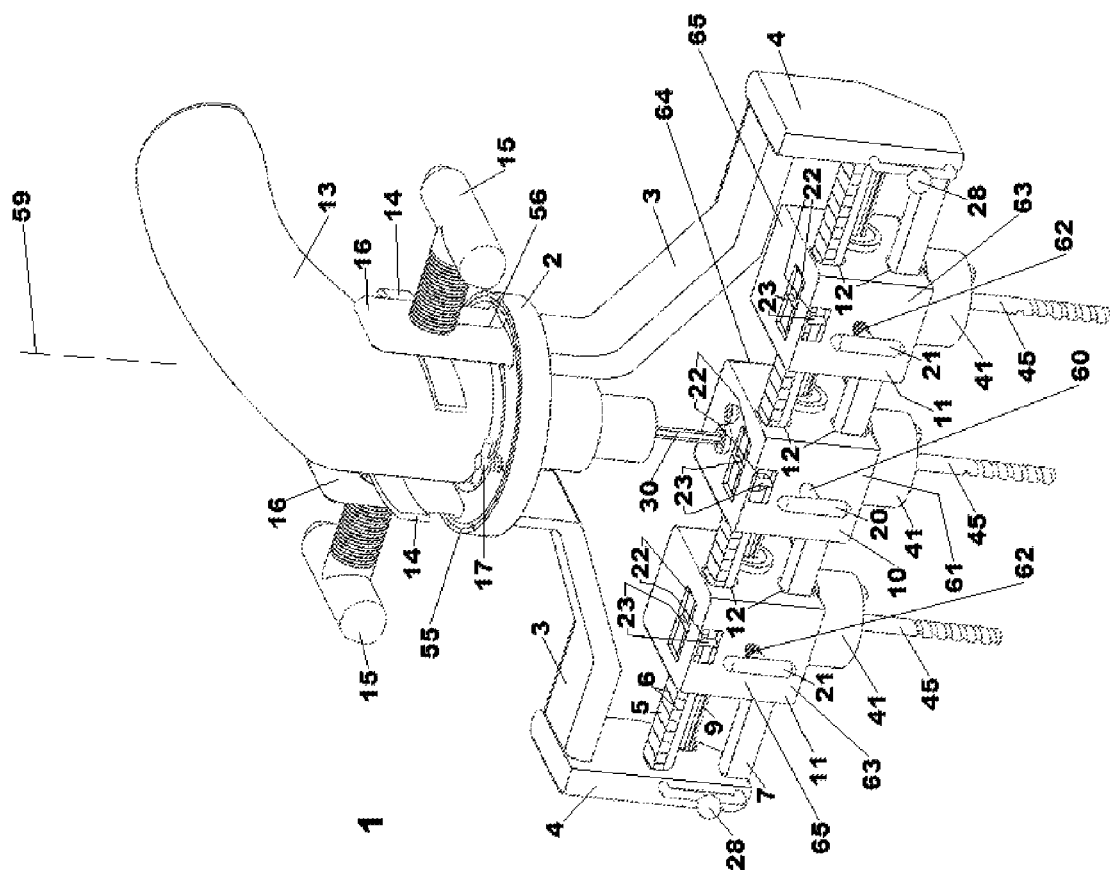
FIG. 1 is a perspective view of this portable adjustable multiple end drill device.
Figure 2:
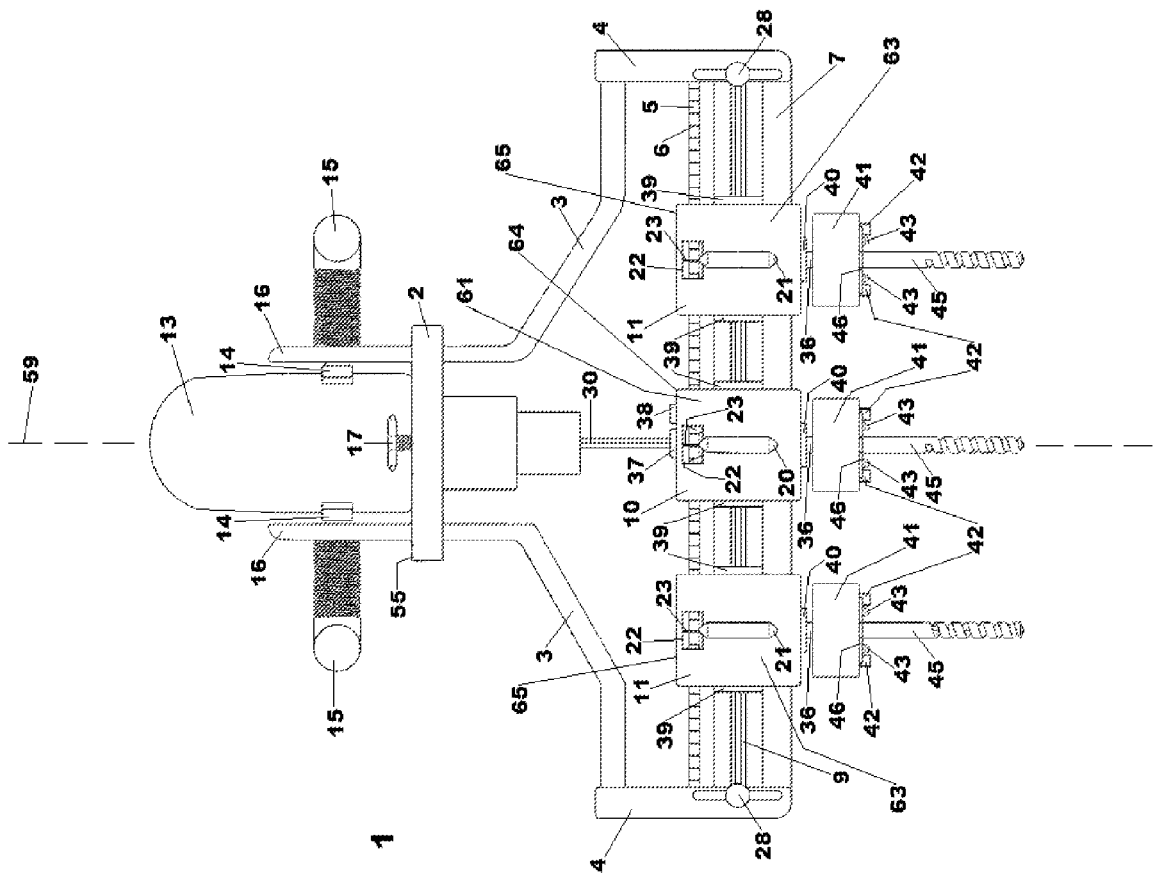
FIG. 2 is a front elevation of the multiple end drill device.
Figure 3:
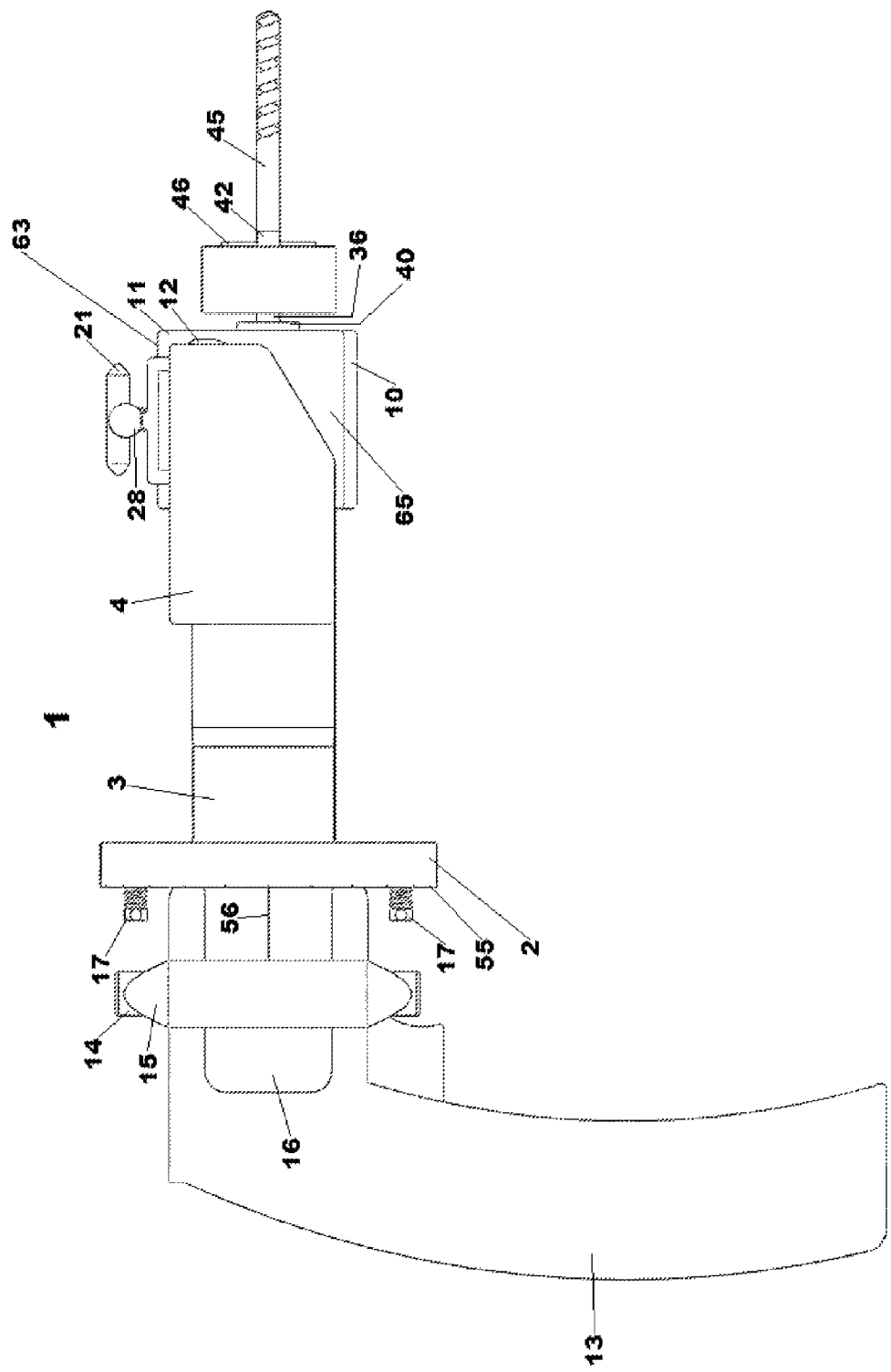
FIG. 3 is a left side elevation of the multiple end drill device.
Figure 4:
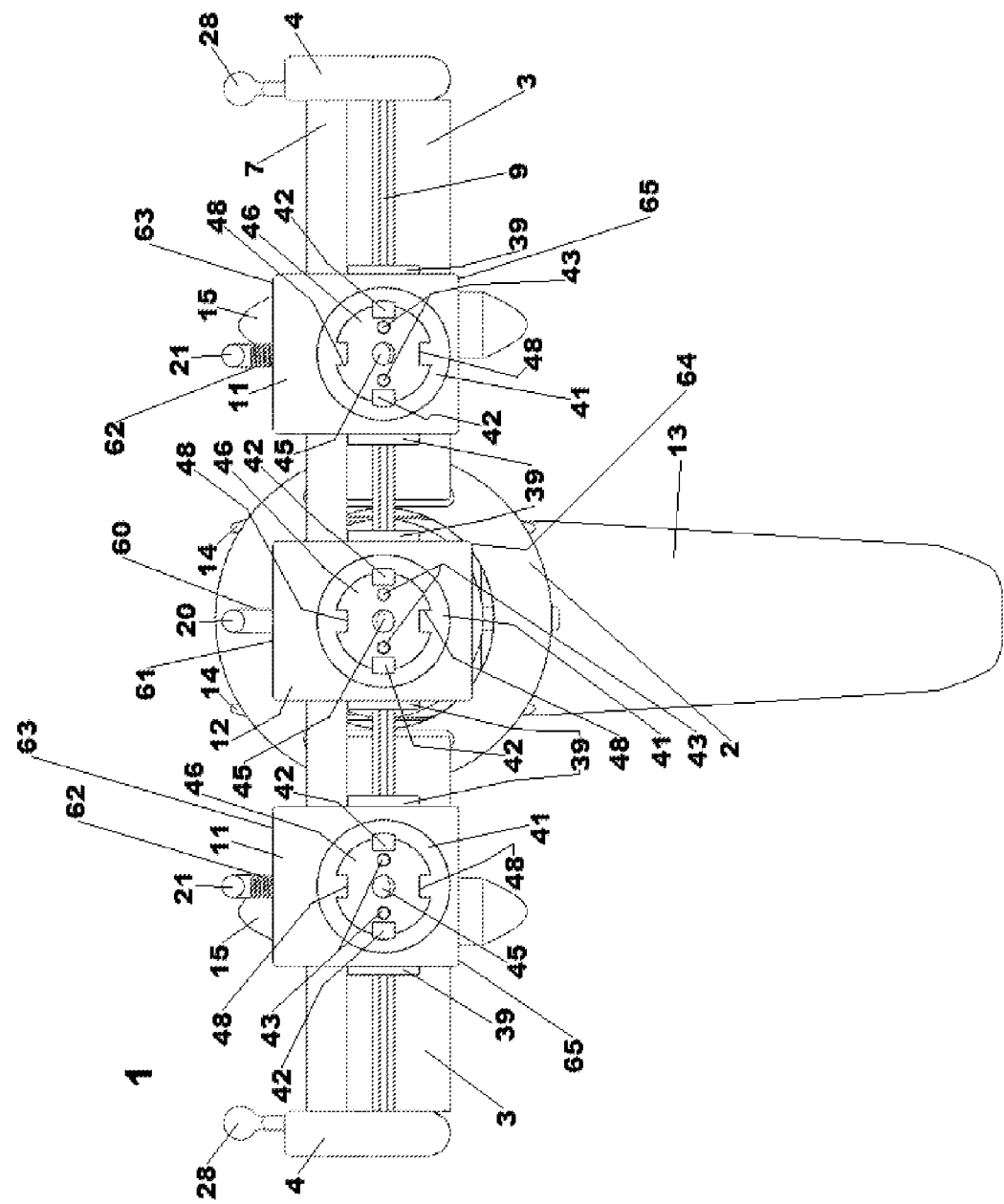
FIG. 4 is a bottom elevation of the multiple end drill device.
Figure 5:
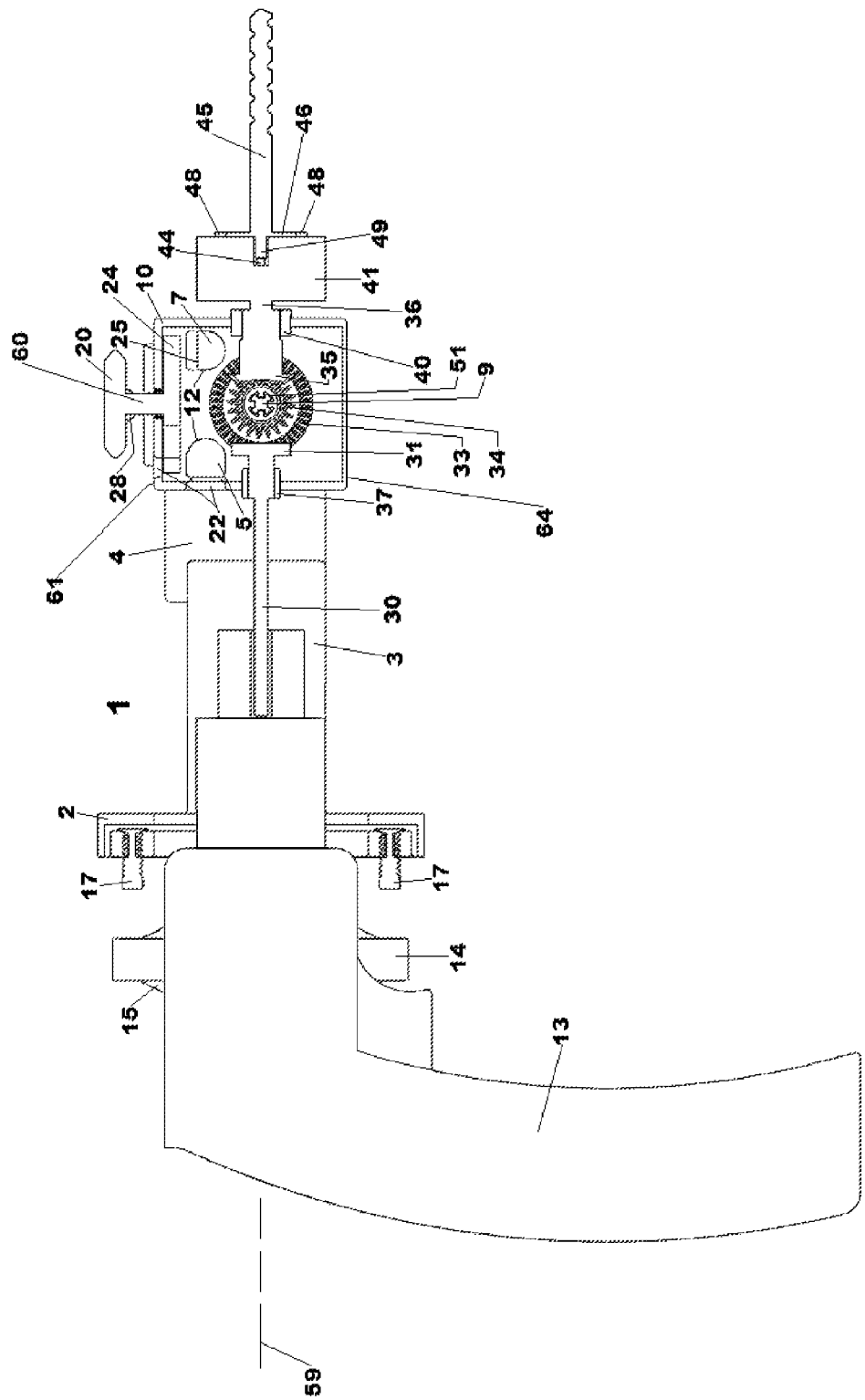
FIG. 5 is a left side section view of the multiple end drill device.
Figure 8:
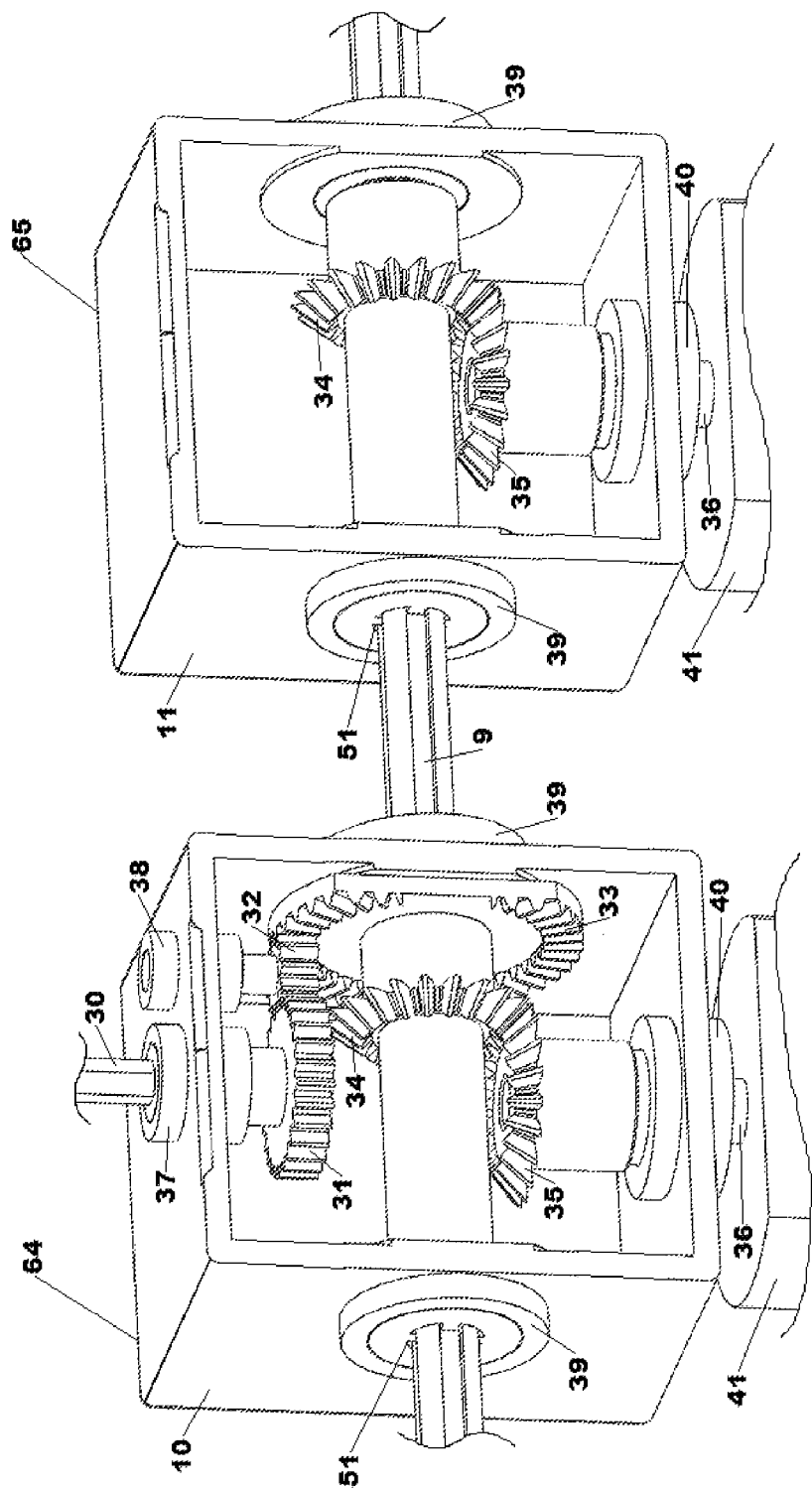
FIG. 8 is another cutaway view of the end drill units, detailing the gears inside each end drill unit.

Referring to FIGS. 5 and 8, the main end drill unit 10 comprises an input shaft 30, which is held by the chuck of the input power source 13. The input shaft 30 is rigidly attached to an input spur gear 31, which is mated to an idler pinion gear 32. Mated to the idler pinion gear 32 is a face gear 33, which is rigidly attached to a miter gear 34. The face gear 33 and miter gear 34 are internally splined, oriented horizontally, and connected to the spline shaft 9. Mated to the horizontal miter gear 34 is a vertical miter gear 35, which is rigidly attached to an output shaft 36. These gears 31, 32, 33, 34, and 35 are located inside the main end drill unit 10. Bearings 37, 38, 39, and 40 are fixed to the walls of the main end drill unit 10, secure the aforementioned transmission components, and permit their rotation. Each auxiliary end drill unit 11 comprises the same gears as the main end drill unit 10, with the exception of the input spur gear 31, the idler pinion gear 32, and the face gear 33. The gears 34 and 35 of each auxiliary end drill unit 11 are located inside 11. Each auxiliary end drill unit 11 includes an output shaft 36. None of the auxiliary end drill units 11 have a vertical input shaft 30.

Referring to FIG. 9, the output shaft 36 (shown in FIG. 8) of each end drill unit 10 and 11 is rigidly attached to a base 41. The base 41 is a cylinder with two protruding rigid tabs 42, two spring-loaded detents 43, and a hexagonal socket 44. The hexagonal socket 44 includes as powerful magnet or another object or plurality of objects suitable for securing a fastener bit, such as at least one ball detent. A compatible drill bit 45 is rigidly attached to as large diameter circular plate 46 that features two through holes 47, two slots 48, and a small protruding stabilization cylinder 49.

Referring to FIG. 10, assembly of the multiple end drill device 1 is accomplished according to the following procedure, prior to operation: the main end drill unit 10 is slid over both guide bars 5 and 7 using through holes 12. The spring-loaded handle 20 of the main end drill unit 10 is then pulled in order to allow the guide bars 5 and 7 to be slid through the main end drill unit 10 without interference from the restraining slab 24 (shown in FIG. 7). Once the viewing window dials 23 of the main end drill unit 10 are aligned with a central rectilinear calibration or zeroth calibration 50 of the upper guide bar 5 and, coincidentally, the indentations 25 of both guide bars 5 and 7 are aligned with the restraining slab 24, the handle 20 is released to allow the restraining slab 24 to occupy the indentations 25. This secures the guide bars 5 and 7 to the main end drill unit 10. The operator may slide a plurality of auxiliary end drill units 11 over the guide bars 5 and 7. The thumb screw 21 of each auxiliary end drill unit 11 are loosened in order to allow the guide bars 5 and 7 to be slid through each auxiliary end drill unit 11 without interference from the restraining slab 26 (shown in FIG. 7). The operator may then secure each auxiliary end drill unit 11 at any position along the guide bars 5 and 7 by tightening its thumb-screw 21. If one wishes to secure an auxiliary end drill unit 11 at a particular position along the upper guide bar 5, one aligns one of the viewing window dials 23 of that auxiliary end drill unit 11 with the guide bar calibration 6 that corresponds to the desired location. Once all end drill units 10 and 11 to be employed have been secured to the guide bars 5 and 7, the spline shaft 9 is inserted in the internally splined cavity 51 of each end drill unit 10 and 11. The guide bars 5 and 7 are inserted in the latch recesses 19 of the end-caps 4. Each of the two ends of each guide bar 5 and 7 contains a recess 52, which each spring-loaded latch 27 (shown in FIG. 6) then occupies in order to secure both guide bars 5 and 7 to both end-caps 4. The spline shaft 9 is inserted in the bearing 53 of each end-cap 4. The tab 54 of each arm 3 is then inserted in the latch-less recess 29 of each end-cap 4. The chuck of the input drill 13 is tightened once the input shaft 30 of the main end drill, unit 10 is in the chuck. The hand-screws 15 are then turned, pressing the input drill holders 14 against the case of the input drill 13 in order to secure the input drill 13 to the bearing 2. Each thumb-screw 17 of the bearing 2 is then tightened in order to prevent unwanted rotation of the arms 3 of the device 1 relative to the input drill 13. If the thumb-screws 17 are loosened, the device 1 may be rotated to various angles with respect to the handle of the input drill 13, allowing the operator to drill a plurality of rectilinearly aligned holes or fasten a plurality of rectilinearly aligned fasteners at these angles while holding the input drill 13 as comfortably as possible. A plurality of calibrations 55 on the bearing 2 and a dial 56 on each vertical bar 16 indicate to the operator the angle between the handle of the input drill 13 and the common plane of the holes to be drilled.

Referring to FIG. 9, each drill bit 45 that the operator wishes to employ is secured to a drill/fastener base 41 of an end drill unit 10 and 11. The two slots 48 of the plate 46 of the drill bit 45 are aligned with the rigid tabs 42 of the drill/fastener base 41. The plate 46 is then pressed flush against the drill/fastener base 41. During this process, the spring-loaded detents 43 are pushed into the base 41. The stabilization cylinder 49, which is present to assist the user in properly aligning the drill bit 45, occupies the hexagonal socket 44. The drill bit 45 is then rotated while being pressed against the base 41, such that the through holes 47 of the plate 46 align with the spring-loaded detents 43 in the base 41. Each detent 43 then emerges through its corresponding hole 47 due to the force from its attached spring (not shown), securing the drill bit 45 in place and preventing unwanted rotation of the bit 45. The device 1 is thus ready for use in rotary drilling applications.

In rotary fastening applications, conventional fastener bits such as 57 having hexagonal bases 58 should be used. Referring to FIG. 11, each fastener bit 57 that is to be employed may be inserted in a hexagonal socket 44, as is done with socket screwdrivers, impact wrenches, and most other tools having hexagonal sockets used to hold fastener bits. Although the bases 41 and drill bits 45 are recommended for use in this device 1, conventional chucks or collets can be built on the end drill units 10 and 11 in lieu of bases 41. Referring again to FIG. 10, removal of an end-cap 4 is accomplished by pulling the latch knob 28 to release the latches 27 (see FIG. 6), and then pulling the end-cap 4 off the arm 3, guide bars 5 and 7, and spline shaft 9. End-caps 4 are removed when one wishes to add or remove end drill units 10 and 11 to or from the device 1 and when one wishes to use a pair of guide bars 5 and 7 and spline shaft 9 of different length and laterally extending arm module in order to augment or compact the device 1.

Therefore, the device 1 enables convenient and simultaneous drilling of a plurality of rectilinearly aligned holes or fastening of a plurality of rectilinearly aligned fasteners. In addition, the device 1 allows its operator to conveniently and rapidly adjust drill bit and/or fastener bit locations along a single axis, with minimal restrictions on movements along that axis. The device 1 also indicates to the operator the rectilinear metrical distances between drill bits and/or fastener bits, thus indicating the distances that will separate any and all holes and/or fasteners from each other. Further, the device 1 allows the operator to adjust the orientation of the input electric drill to any angle relative to the common plane of the holes to be drilled or that of the fasteners to be fastened. Additionally, the device 1 allows for convenient addition of end drill units to the device 1 or removal of end drill units from the device 1 that are not in use or needed for an operation prior to drilling holes or fastening fasteners.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

What is claimed is:

1. An end drill device for a rotary power source, comprising:
    a main end drill unit communicating with the power source via a first transmission shaft;
    a plurality of auxiliary end drill units communicating with the main end drill unit via a second transmission shaft;
    at least one guide bar for holding the main end drill unit and the auxiliary end drill units, wherein a position of each of the auxiliary end drill units relative to the main end drill unit is independently adjustable; and
    a bearing device for rotating the guide bar, the main end drill unit and the auxiliary end drill units relative to the power source.

2. The end drill device according to claim 1 further including a restraint device for holding the rotary power source, wherein the restraint device includes a dial and the bearing device includes a plurality of angular calibrations.

3. The end drill device according to claim 1 further including a pair of arms attached to the bearing device and an end cap connected to each arm wherein each end-cap includes an internally splined bearing and spring loaded latches rigidly attached to a knob and each end cap further including recesses that accommodate the latches when the latches are pushed into their respective recesses by their respective springs.

4. The end drill device according to claim 1, wherein the device includes a pair of guide bars and each guide bar includes a recess wherein each of the recesses accommodates its respective latch when the end of each guide bar is inserted in its respective recess in the end-caps and wherein at least one of the guide bars includes a plurality of rectilinear calibrations including a central rectilinear calibration and wherein the guide bars include at least three indentations located at the centers of the guide bars.

5. The end drill device according to claim 1, wherein the main end drill unit includes a casing having a system of main gears that are journaled in bearings and wherein two of the main gears are rigidly attached to each other and include an internally splined cavity wherein the casing of the main end drill unit includes through holes for slidably accommodating the guide bar;
    the main end drill unit including viewing windows and dials;
    the main end drill unit including in its casing a restraining slab attached to an external fastening device;
    wherein the second transmission shaft transmits rotary power to the gear system of each auxiliary end drill unit;
    and wherein the system of main gears transmits rotary power from the first transmission shaft to the second transmission shaft and to a respective output shaft and a drill/fastener base of the main end drill unit and drill bit or fastener bit connected to the drill/fastener base.

6. The end drill device according to claim 5 wherein the drill/fastener bases includes protruding rigid tabs, spring-loaded detents and a hexagonal socket for securing a fastener bit.

7. The end drill device according to claim 5, wherein the drill bit includes a rigidly attached plate having through holes, slots and a stabilization cylinder for attachment to the drill/fastener base.

8. The end drill device according to claim 1, wherein each of the auxiliary end drill units includes a casing having end unit gears journaled in bearings, one of the end unit gears including an internally splined cavity;
    the casing of the auxiliary end drill unit including through holes for accommodating the guide bar;
    the auxiliary end drill unit including viewing windows with dials;
    the auxiliary end drill unit including in its casing a restraining slab attached to a fastening element;
    and wherein the end unit gears receive rotary power from the second transmission shaft and transmit rotary power to a respective output shaft and drill/fastener base of the auxiliary end drill unit and drill bit or fastener bit connected to the drill/fastener base.

9. An end drill device, comprising:
    a restraint device for holding a rotary power source;
    a main end drill unit communicating with the power source via a first transmission shaft;
    a plurality of auxiliary end drill units communicating with the main end drill unit via a second transmission shaft;
    a pair of guide bars for holding the main end drill unit and the auxiliary end drill units, wherein the auxiliary end drill units are moveable on the guide bars and a position of each of the auxiliary end drill units relative to the main end drill unit is independently adjustable; and a bearing device for rotating the guide bars, the main end drill unit and the auxiliary end drill units relative to the power source.

10. The end drill device according to claim 9 wherein the second transmission shaft includes a spline shape.

11. The end drill device according to claim 9 wherein the restraint device includes a dial and the bearing device includes a plurality of angular calibrations.

12. The end drill device according to claim 9 further including a pair of arms attached to the bearing device and an end cap connected to each arm wherein each end-cap includes an internally splined bearing and spring loaded latches rigidly attached to a knob and each end cap further including recesses that accommodate the latches when the latches are pushed into their respective recesses by their respective springs.

13. The end drill device according to claim 9, wherein each guide bar includes a recess wherein each of the recesses accommodates its respective latch when the end of each guide bar is inserted in its respective recess in the end-caps and wherein at least one of the guide bars includes a plurality of rectilinear calibrations including a central rectilinear calibration and wherein the guide bars include at least three indentations located at the centers of the guide bars.

14. The end drill device according to claim 9, wherein the main end drill unit includes a casing having a system of main gears that are journaled in bearings and wherein two of the main gears are rigidly attached to each other and include an internally splined cavity wherein the casing of the main end drill unit includes through holes for slidably accommodating the guide bars;

the main end drill unit including viewing windows and dials;

the main end drill unit including in its casing a restraining slab attached to an external fastening device;

wherein the second transmission shaft transmits rotary power to the gear system of each auxiliary end drill unit;

and wherein the system of main gears transmits rotary power from the first transmission shaft to the second transmission shaft and to a respective output shaft and a drill/fastener base of the main end drill unit and drill bit or fastener bit connected to the drill/fastener base.

15. The end drill device according to claim 9, wherein each of the auxiliary end drill units includes a casing having end unit gears journaled in bearings, one of the end unit gears including an internally splined cavity;

the casing of the auxiliary end drill unit including through holes for accommodating the guide bars;

the auxiliary end drill unit including viewing windows with dials;

the auxiliary end drill unit including in its casing a restraining slab attached to a fastening element;

and wherein the end unit gears receive rotary power from the second transmission shaft and transmit rotary power to a respective output shaft and drill/fastener base of the auxiliary end drill unit and drill bit or fastener bit connected to the drill/fastener base.

16. The end drill device according to claim 14 wherein the drill/fastener bases includes protruding rigid tabs, spring-loaded detents and a hexagonal socket for securing a fastener bit.

17. The end drill device according to claim 14, wherein the drill bit includes a rigidly attached plate having through holes, slots and a stabilization cylinder for attachment to the drill/fastener base.

18. The end drill device according to claim 9 further including hand-screws for securing the power source.

19. A method for assembling an end drill device comprising the steps of:

sliding a main end drill unit and a plurality auxiliary end drill units over first and second guide bars;

displacing fasteners for the main end drill unit and the auxiliary end drill units to allow the first and second guide bars to be slid through the end drill units without interference from a respective restraining slab;

securing the main end drill unit to the first and second guide bars by tightening the fasteners against the first and second guide bars once viewing window dials of the main end drill unit are aligned with a zeroth calibration of either or both of the first and second guide bars and indentations of both of the first and second guide bars are aligned with the restraining slab;

aligning an auxiliary end drill unit at a metrically designated location along at least one of the first and second guide bars by aligning one of the viewing window dials of the auxiliary end drill unit with a particular calibration corresponding to the particular metrically designated location;

securing the auxiliary end drill units to the first and second guide bars by tightening fasteners;

inserting a splined power transmission shaft in an internally splined cavity of each of the end drill units once all of the end drill units to be employed have been secured to the first and second guide bars;

inserting the first and second guide bars in latch recesses of end-caps;

securing the first and second guide bars to end-caps;

inserting the splined power transmission shaft in a bearing of each of the end-caps;

securing a rotary power source to an input shaft of the main end drill unit;

securing a rotary power source to restraints for the rotary power source;

rotating the end drill device to various angles with respect to the rotary power source;

securing drill bits to a respective the drill/fastener base of a respective end drill unit;

providing a plate for the drill bits, wherein each plate includes slots which are aligned with rigid tabs formed on a drill/fastener base, wherein the plate is pressed flush against the drill/fastener base;

simultaneously rotating the drill bit while pressing against the base such that through holes formed in the base align with spring-loaded detents in the base, allowing each of the detents to emerge through its corresponding hole due to the force from its respective attached spring to secure the drill bit in place and preventing unwanted rotation of the drill bit;

securing fastener bits and/or drill bits to the main end drill unit and/or the auxiliary end drill units; and removing the end-caps from the first and second guide bars and the splined power transmission shaft to add or remove end drill units.

* * * * *